Aug. 8, 1950     E. A. ROLF ET AL     2,517,716
WAGON BOX HOIST
Filed Feb. 2, 1946     2 Sheets-Sheet 1
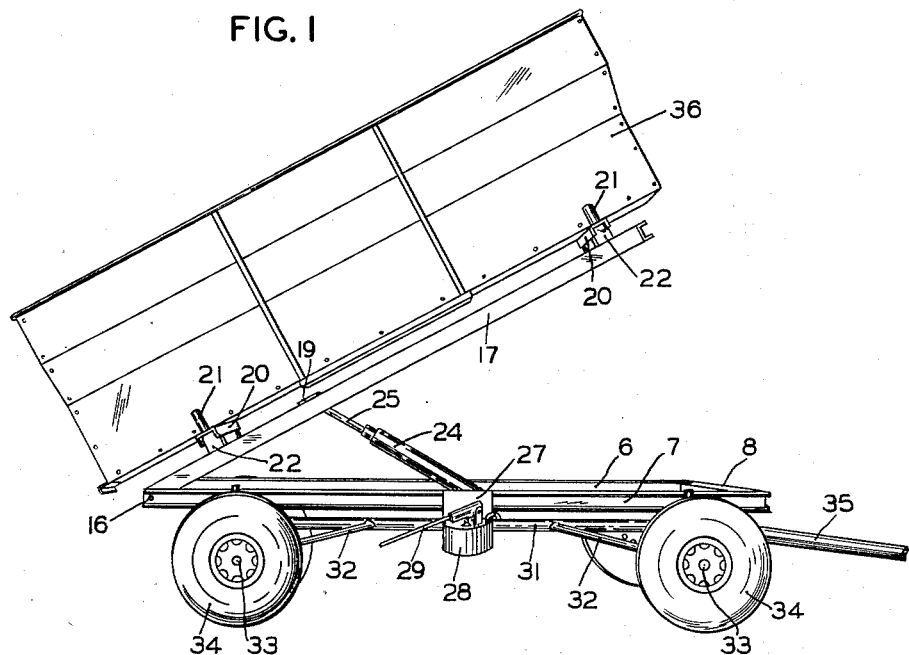
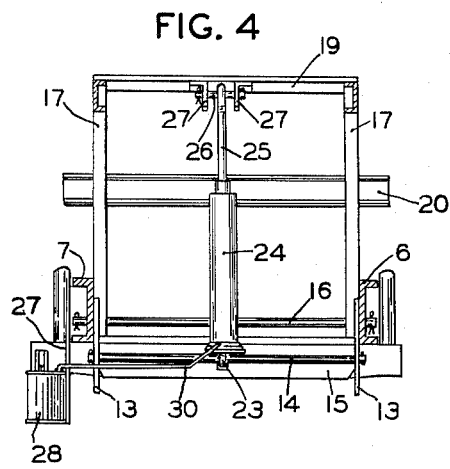
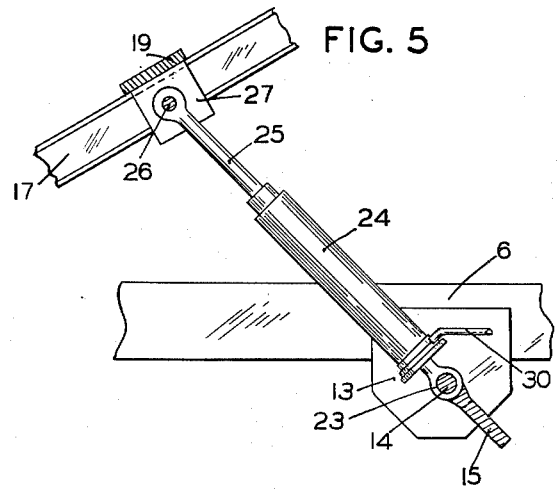
*INVENTOR.*
ELMER A. ROLF
HOWARD HOEFER
BY *Williamson & Williamson*
ATTORNEYS Aug. 8, 1950 E. A. ROLF ET AL 2,517,716
WAGON BOX HOIST
Filed Feb. 2, 1946 2 Sheets-Sheet 2

INVENTOR.
ELMER A. ROLF
BY HOWARD HOEFER

*Williamson & Williamson*

ATTORNEYS

Patented Aug. 8, 1950

2,517,716

UNITED STATES PATENT OFFICE 2,517,716

WAGON BOX HOIST

Elmer A. Rolf and Howard Hoefer,
Glencoe, Minn.

Application February 2, 1946, Serial No. 645,022

1 Claim. (Cl. 298—22)

This invention relates to a wagon box hoist.

It is a general object of the invention to provide a hoist for wagon boxes which is particularly adaptable for use on the farm, and wherein a wagon box can be readily mounted upon a wheeled frame such as a wheeled trailer with the hoist removably mounted on the trailer and also removably supporting the wagon box in such a manner that the box can be readily tilted to a dumping position and lowered to a load receiving position. The removability of the hoist relative to the wagon box and the trailer upon which it is carried is a feature which permits the farmer to buy a hoist which can be readily used in combination with the wagon box without requiring any special mounting or other construction. Furthermore, the hoist need not be secured by clamps or bolts to either the trailer axles or the wagon box so that mounting and dismounting thereof is reduced to the simplest possible operations.

The above and other objects and advantages of the invention will more fully appear from the following description made in connection with the accompanying drawings, wherein like reference characters refer to the same parts throughout the views, and, in which:

Figure 1 is a perspective view of my device mounted on a trailer and supporting a wagon box in dumping position;

Figure 4 is a transverse vertical sectional view taken approximately on the line 4—4 of Figure 3; and Figure 5 is an enlarged fragmentary sectional view through the device showing the hydraulic power hoisting element.

Figure 2:
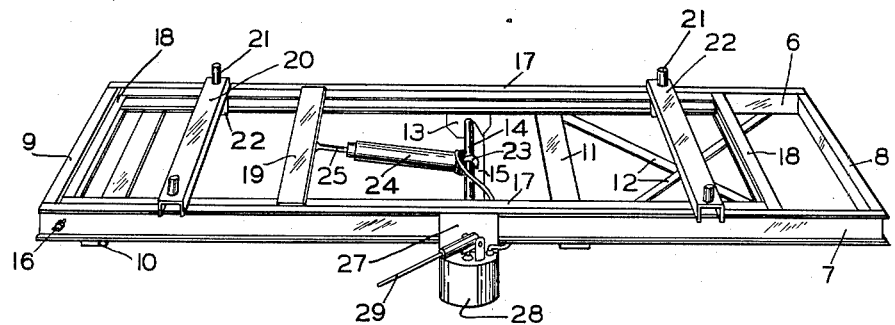
Figure 2 is a perspective view of the hoist in its collapsed position.

The device includes a first frame A having sides 6 and 7 and end cross members 8 and 9. The frame A may also be reinforced by cross members 10 and 11 and by diagonal braces 12. It should be noted that the cross members 10 and 11 and braces 12 lie at the underside of the frame A.

Intermediate the ends of the frame are plates 13 which extend downwardly therefrom and between them is journalled a rod 14 which is straightened throughout its length by a web 15 which may be welded along the bar 14.

A second frame B is pivotally connected to the left hand or rear end of the frame A by means of a bar 16 which extends across the frame A between the side members 6 and 7. The frame B has side members 17 and end members 18. A plate 19 extends between the side members 17 intermediate the ends thereof and preferably closer to the rear ends of said side members.

Extending across the upper portions of the side members 17 adjacent opposite ends thereof are bolsters 20 having short pins 21 extending upwardly therefrom, the bolsters 20 being elevated a short distance above the side members 17 by attachment plates 22 which preferably are welded to the inner sides of the frame members 17 and extend slightly thereabove.

Secured to the cross bar 14 which extends between the first frame side members 6 and 7 is a ring 23 which is secured to an end of a fluid cylinder 24, the latter having a slidable piston rod 25 extending therefrom and pivotally connected to a pin 26 (Figures 4 and 5) mounted between brackets 27 on the cross bar or plate 19 which extends between the sides 17 of the frame B.

The side members 7 of the first frame A has a bracket plate 27 mounted on the outer side thereof intermediate the ends of the member, and said plate 27 extends downwardly a short distance below the frame member 7. The bracket plate 27 supports a hydraulic pumping unit 28 having a suitable handle 29. The details of the hydraulic pump are not shown since they are well known to those familiar with the art. The pump 28 is connected by a conduit 30 to the lower end of the fluid cylinder 24, and as is well known the pump can be actuated to force the piston rod 25 out of the upper end of said cylinder 24.

The hoist shown in Figure 2 can be placed upon a trailer such as is illustrated in Figure 1. The trailer includes a skeleton frame 31 having radius rods 32 extending to axles 33 upon which are wheels 34. It will be seen that the first frame A and second frame B are in nested position as in Figure 2, when the hoist is collapsed, the second frame B being shorter and lying within the confines of the first frame A. It is not necessary to provide any means for attaching the hoist to the trailer axles or its frame 31 for the reason that the draft tongue 35 is secured to the forward trailer axle 33 and is not connected to the hoist itself.

Figure 3:
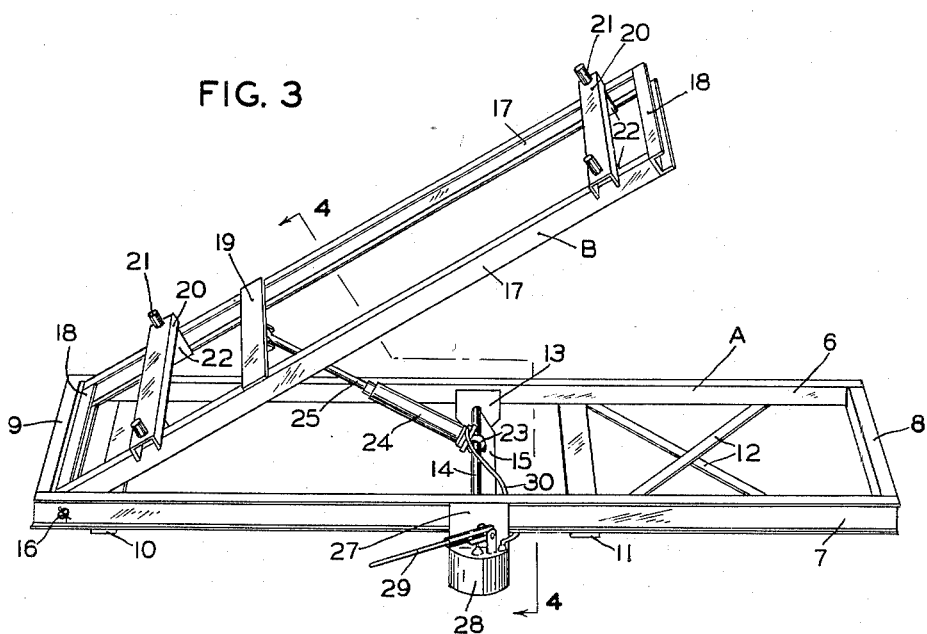
Figure 3 is a perspective view of the device in its raised position.

The wagon box 36 is then placed upon the bolsters 20 between the upstanding members 21 at the ends of the bolsters. While no details of the underside of the wagon box are shown, such boxes are usually provided with lower cross pieces which prevent the box from slipping on the second frame B when said second frame is elevated as shown in Figures 1 and 3.

From the foregoing description it will be seen that we have provided a wagon box hoist which can be used with a trailer and wagon box or which can be readily removed from the trailer so that the latter is readily useable for other purposes where the hoist is not needed. The hoist can be made up as a unit as illustrated in the drawing and sold as such so that the purchaser can removably mount it upon any suitable carrying vehicle.

The device is relatively simple in structure and since it has no mounting clamps or bolts it can be placed upon or removed from the carrying vehicle in a negligible amount of time. When the device is in its collapsed position it will carry the wagon box at a height no greater than if the box were mounted on the trailer on the usual sills and bolsters in the customary manner, and, of course, by reason of the ability of the frame members to nest one within the other the device takes up a minimum of room in shipment.

It will, of course, be understood that various changes may be made in the form, details, arrangement and proportions of the various parts without departing from the scope of our invention.

What we claim is:

In a wagon box supporting frame and hoist, a double frame unit, the two parts of which are pivotally connected at their rear ends whereby the first of said frame parts can swing upwardly and rearwardly relative to the second, said second frame part being adapted for mounting as a complete unit on a wheeled chassis, a device connected between said first and second frame parts to elevate said first frame part to a dumping position, laterally spaced and laterally and inwardly facing wagon box retaining means extending upwardly from said frame unit a short distance relative to the over-all height of said frame unit, whereby a wagon box can be lifted laterally on to said frame unit, said first frame part having a longitudinal facing abutment thereon to prevent longitudinal movement of a wagon box placed on said frame, said abutment extending upwardly only a short distance relative to the height of said frame, said laterally spaced box retaining means and said abutment being free of any positive wagon box connecting means.

ELMER A. ROLF.
HOWARD HOEFER.

REFERENCES CITED

The following references are of record in the file of this patent:

UNITED STATES PATENTS

| Number | Name | Date |
| --- | --- | --- |
| 1,300,185 | Montgomery | Apr. 8, 1919 |
| 1,366,666 | Juelfs | Jan. 25, 1921 |
| 1,617,585 | Foster | Feb. 15, 1927 |
| 1,782,667 | Shelhamer | Nov. 25, 1930 |
| 1,889,520 | Anthony | Nov. 29, 1932 |
| 2,210,142 | Day | Aug. 6, 1940 |
| 2,358,224 | Golay | Sept. 12, 1944 |